(12) United States Patent
Djordjevic et al.

(10) Patent No.: US 10,291,318 B2
(45) Date of Patent: May 14, 2019

(54) PHYSICAL LAYER SECURITY IN OPTICAL COMMUNICATIONS USING BESSEL MODES

(71) Applicant: NEC Laboratories America, Inc., Princeton, NJ (US)

(72) Inventors: Ivan Djordjevic, Tuscon, AZ (US); Shaoliang Zhang, Princeton, NJ (US); Ting Wang, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/964,790

(22) Filed: Apr. 27, 2018

(65) Prior Publication Data

US 2019/0007134 A1 Jan. 3, 2019

Related U.S. Application Data

(60) Provisional application No. 62/490,820, filed on Apr. 27, 2017, provisional application No. 62/504,838, filed on May 11, 2017.

(51) Int. Cl.

| | | |
|---|---|---|
| *H04B 10/00* | (2013.01) | |
| *H04B 10/112* | (2013.01) | |
| *H03M 13/11* | (2006.01) | |
| *H04L 1/00* | (2006.01) | |
| *H04L 27/36* | (2006.01) | |
| *H03M 13/25* | (2006.01) | |
| *G02B 6/028* | (2006.01) | |
| *H04B 10/11* | (2013.01) | |
| *H04B 10/516* | (2013.01) | |
| *H04L 29/06* | (2006.01) | |
| *H04J 14/00* | (2006.01) | |
| *H04B 10/2581* | (2013.01) | |
| *H04J 14/04* | (2006.01) | |

(52) U.S. Cl.
CPC ....... *H04B 10/1125* (2013.01); *G02B 6/0288* (2013.01); *H03M 13/1102* (2013.01); *H03M 13/255* (2013.01); *H04B 10/11* (2013.01); *H04B 10/5161* (2013.01); *H04L 1/0057* (2013.01); *H04L 27/36* (2013.01); *H04L 63/08* (2013.01); *H04B 10/2581* (2013.01); *H04J 14/04* (2013.01)

(58) Field of Classification Search
CPC .............................. H04B 10/85; H04H 60/23
See application file for complete search history.

(56) References Cited

U.S. PATENT DOCUMENTS

2017/0026095 A1* 1/2017 Ashrafi ................ H04B 7/0456

* cited by examiner

*Primary Examiner* — Daniel G Dobson
(74) *Attorney, Agent, or Firm* — Joseph Kolodka

(57) ABSTRACT

Aspects of the present disclosure describe physical layer security in optical communications wherein Bessel modes are employed and significantly outperform conventional schemes with respect to secrecy and advantageously benefit from atmospheric turbulence effects with beam splitting attacks.

3 Claims, 6 Drawing Sheets

PHYSICAL LAYER SECURITY IN OPTICAL COMMUNICATIONS USING BESSEL MODES

CROSS REFERENCE TO RELATED APPLICATIONS

This application claims the benefit of U.S. Provisional Patent Application Ser. No. 62/490,820 filed 27 Apr. 2017 and U.S. Provisional Patent Application Ser. No. 62/504,838 filed 11 May 2017, both of which is incorporated by reference as if set forth at length herein.

TECHNICAL FIELD

This disclosure relates generally to optical networking and communications. More particularly, it pertains to physical layer security in optical communications using Bessel modes.

BACKGROUND

The networked and mobile computing environment that defines much of contemporary society has provided innumerable convenience and productivity benefits. Given such benefits—society have become increasingly dependent upon services delivered thereon. Perhaps unknown to many, underlying these services are vast optical networks transporting incalculable volumes of data.

Given the utility and importance of optical communications and networks, systems, methods, and structures that may enhance their security would represent a welcome addition to the art.

SUMMARY

An advance in the art according to aspects of the present disclosure directed to physical layer security in optical communications using Bessel modes.

Viewed from a first aspect, systems, method, and structures according to aspects of the present disclosure generally include an optical communications system comprising a free-space-optical (FSO) transmitter in optical communication with a FSO receiver, said system characterized by: a physical-layer security (PLS) scheme employing Bessel modes, wherein the Bessel modes are solutions of a wave equation in a step-index MMF of core radius a, and the corresponding z-component of electric field in cylindrical coordinates $(r,\phi,z)$ can be represented as:

$$E_z(r,\phi,z) = AJ_m(k_r r)e^{jm\phi}e^{j\beta z}, \quad r \leq a$$

where $\beta$ is the propagation constant, $J_m(\cdot)$ is the Bessel function of the m-th order, and $k_r$ is defined as $k_r = \sqrt{n_{core}^2 k_0^2 - \beta^2}$, with $k_0 = 2\pi/\lambda$ being the free space wave number and $n_{core}$ being refractive index of the core.

In sharp contrast to the prior art, systems, methods and structures according to the present disclosure—wherein Bessel modes are employed—significantly outperform conventional schemes with respect to secrecy and advantageously and surprisingly benefit from atmospheric turbulence effects with respect to beam splitting attacks

BRIEF DESCRIPTION OF THE DRAWING

A more complete understanding of the present disclosure may be realized by reference to the accompanying drawing in which.

Figure 1:
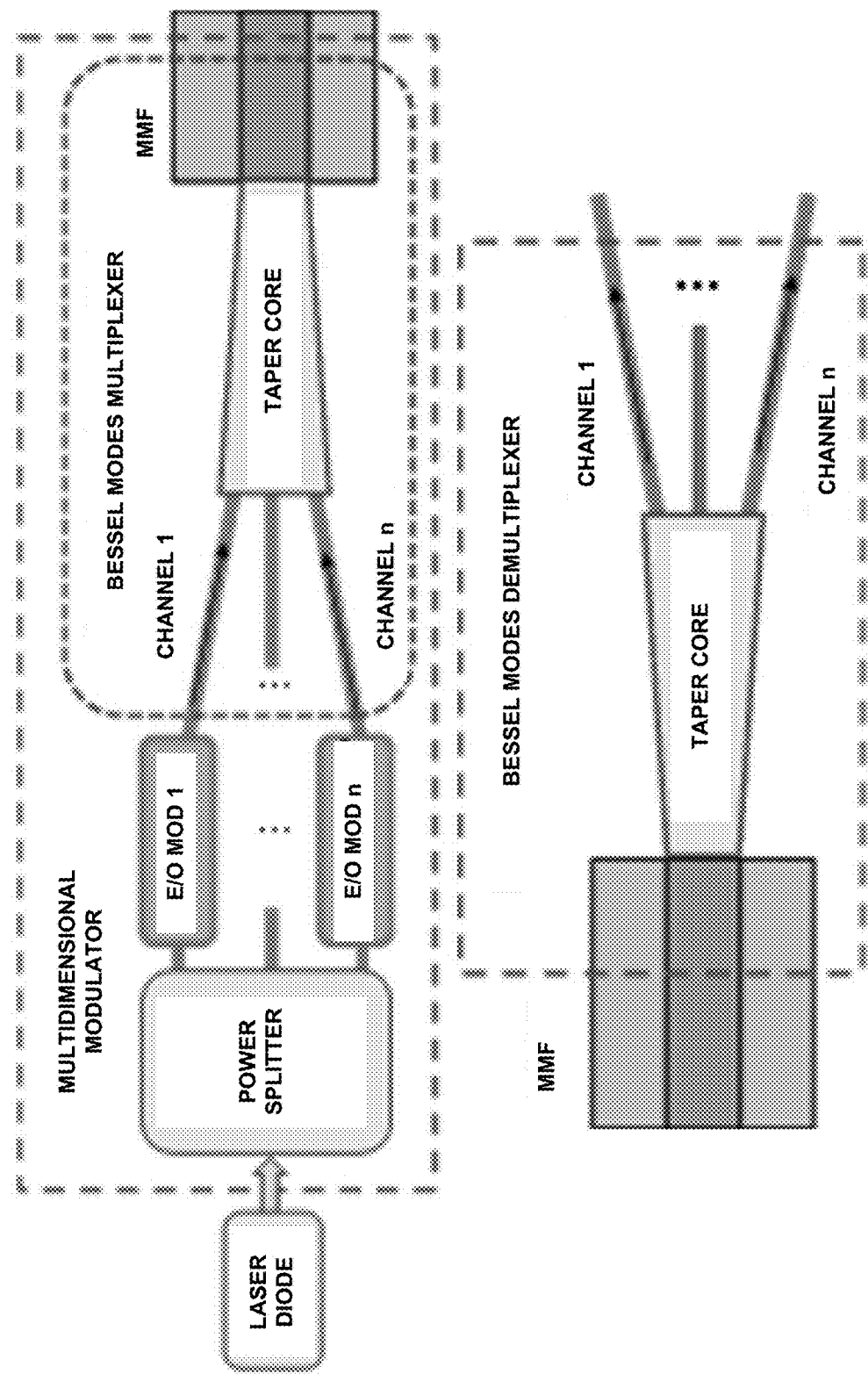
FIG. 1 is a schematic block diagram showing illustrative configurations of (top) mode-multiplexed//multidimensional modulator and (bottom) mode-demultiplexer for Bessel modes wherein E/O Mod is an electro-optical modulator, MMF is multi-mode fiber, according to aspects of the present disclosure.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we begin by noting that the "information society" in which we live is significantly affected by Internetworking technologies (i.e., the Internet), and is characterized by a never-ending demand for higher information carrying capacity and distance-independent connectivity. Importantly, this exponential growth of Internet traffic does not appear to be diminishing any time soon. Given this growth, one would expect that the security of data transported via the Internet would be of utmost concern. And while there are many proposals on how to deal with bandwidth, the security of optical networks (ONs)—which generally serve as the "backbone" of the Internet—seems to be completely neglected. Significantly—and as will be readily appreciated by those skilled in the art—if one gains access to underlying optical signals transporting Internet traffic, an unlimited amount of data may be compromised. Accordingly, the security of optical networks is a concern that must be addressed.

Fortunately, in response to such concern with respect to the security of optical communications systems, quantum key distribution (QKD) and chaotic cryptography techniques have been recently proposed as viable security approaches. With respect to QKD, most research efforts have focused on two-dimensional QKD, such as the polarization state of photons. Unfortunately, data rates for systems employing quantum key exchange are very low, and their transmission distance is limited.

On the other hand, in chaos cryptography the dynamics of a laser employed is prescribed to follow a given trajectory depending on the information to be transmitted. To decode the prescribed trajectory, synchronism between a transmitter and a receiver is required.

To avoid high cost associated with QKD, properly designed fiber Bragg gratings (FBGs)—operating as optical encryption devices have been advocated. In fact, we have proposed employing a super-structured Bragg gratings (SS-BGs) approach to all-optical encryption. With such an approach, security is provided by a transformation of transmitted signals into noise-like patterns in the optical domain, thereby hiding any data signal structure to non-authorized users. Unfortunately, however, since impulse responses of encoders used are quasi-orthogonal—and even though the method is heuristic—these systems suffer from a limited cardinality of corresponding optical encryption signal set.

We note that cardinality has been significantly improved by using discrete prolate spheroidal sequences (also known Slepian sequences) based FBGs—designed using discrete layer peeling algorithm (DLPA)—that we have described elsewhere.

One interesting alternative to QKD worth mentioning is a so-called Y-00 protocol—which is based on mesoscopic coherent states, having an average number of photons per pulse ranging from 100 to 1000, which exceeds the QKD rates up to 1000 times. Unfortunately, as is known, the Y-00 protocol has the security equivalent to that of a classical non-random stream cipher.

Given these infirmities associated with prior art approaches—and to advantageously overcome security issues of future optical networks including both constrained (optical fiber) and free-space optical (FSO)—we advantageously—and according to aspects of the present disclosure—employ Bessel modes. As we shall show and describe, Bessel modes may be generated with a section of step-index multi-mode fiber (MMF). Of further advantage according to the present disclosure, given the orthogonality of Bessel modes, they can be used as an additional degree of freedom (DOF), to improve both spectral efficiency and physical-layer security (PLS). More particularly with respect to systems, methods, and structures according to the present disclosure—further advantage arises given that the intensity in cross-section of a Bessel beam is propagation invariant, or diffraction free. Consequently, we have determined that Bessel beams are excellent for FSO links instead of more popular Laguerre-Gaussian (LG) beams We note that the Bessel modes are solutions of a wave equation in a step-index MMF of core radius a, and the corresponding z-component of electric field in cylindrical coordinates (r,φ,z) can be represented as:

$$E_z(r,\phi,z)=AJ_m(k_r r)e^{jm\phi}e^{j\beta z}, \; r\leq a \quad [1]$$

where β is the propagation constant, $J_m(\cdot)$ is the Bessel function of the m-th order, and $k_r$ is defined as $k_r=$ $\sqrt{n_{core}^2 k_0^2-\beta^2}$, with $k_0=2\pi/\lambda$ being the free space wave number and $n_{core}$ being refractive index of the core.

We note further that the intensity of Bessel beam obeys the following relationship I(x, y, z)=I(x, y), and thus the beam is the diffraction free, indicating that Bessel beams are indeed excellent candidates to be used in FSO links in addition to MMF links. The step-index MMF-based mode-multiplexer/multidimensional modulator and demultiplexer configurations to be used in physical-layer security for the next generation of Bessel modes-based optical networks are shown in FIG. 1.

With reference to that FIG. 1 which shows configurations of (top) mode-multiplexer/multidimensional modulator and (bottom) mode-demultiplexer for Bessel modes. As may be observed, the mode-multiplexer and multidimensional modulator are shown in FIG. 1 (top). In that figure, shown is a continuous wave (CW) laser output signal is split into N branches by a 1:N power splitter (such as a star coupler or tree network of splitters). Each individual output of the power splitter is applied to an input to an electro-optical modulator (E/O MOD), such as Mach-Zehnder modulator (MZM), phase modulator (PM), or I/Q modulator.

The polarization state is not used for raw key transmission, but to detect the presence of an eavesdropper (Eve) only, and as such is not shown to facilitate and simplify this discussion. With the application of I/Q modulators (MZMs), 2N-dimensional (N-dimensional) signaling is possible. The number of bits per symbol in such multidimensional signal constellation will be $\log_2 M$, where M is the signal constellation size. The Bessel modes-based multiplexer includes N waveguides, taper-core fiber, and MMF to excite proper Bessel modes.

At a receiver side, as shown in FIG. 1(bottom), the multimode signal is mode-demultiplexed, through the effect of properly designed taper-core fiber and a series of waveguides, such that each output represents a projection along corresponding Bessel mode.

A local laser is used to coherently detect the signals transmitted in all Bessel modes. Note that the imperfect excitation of Bessel modes on the transmitter side and the imperfect mode-demultiplexing on the receiver side will result in static mode coupling.

We can describe this process by a channel matrix H of full rank N. The spectral (eigenvalue) decomposition of the channel matrix can be used to compensate for imperfect generation and detection of Bessel modes. The spectral decomposition of the channel matrix is given by:

$$H=U\Lambda U^\dagger, \Lambda=\text{diag}(\text{eig}(H)), U=\text{eigenvectors}(H), \quad [2]$$

where U is the unitary matrix ($UU^\dagger=I$) and Λ is a diagonal matrix of eigenvalues of H.

By denoting the transmitted vector of symbols over different Bessel modes as x, the received vector (after the mode-demultiplexing and coherent optical detection) as y, and the equivalent noise vector as z, the channel model will be y=Hx+z. By pre-shaping the transmitted vector x by multiplying with unitary matrix U, we obtain the modified transmitted vector by $\tilde{x}=Ux$. By multiplying the received vector now with $U^\dagger$ matrix we obtain:

$$U^\dagger y = U^\dagger(H\tilde{x}+z) = U^\dagger(U\Lambda U^\dagger \tilde{x}+z) = \quad [3]$$
$$U^\dagger U \Lambda U^\dagger \tilde{x} + U^\dagger z = \underline{U^\dagger U}_I \Lambda \underline{U^\dagger U}_I x + U^\dagger z = \Lambda x + U^\dagger z.$$

Therefore, based on equation (3), given that Λ-matrix is diagonal, it is clear that spectral decomposition can be used to compensate for imperfect generation and detection of Bessel modes, and this compensation needs to be done only once.

Note that conventional MMFs are not suitable for PLS as the number of higher excited modes can be too large, and some of these modes could be high-loss-modes. However, for the PLS purposes, the new types of fibers would be needed, with number of modes in order tens, rather than typical few-mode fibers (FMFs) that support less than ten modes.

At this point we note that—according to aspects of the present disclosure—three types of physical-layer security schemes based on Bessel modes are possible namely, classical, semi-classical, and continuous variable (CV)-QKD schemes—depending on the desired level of security.

It is known that classical protocols rely on the computational difficulty of reversing the one-way functions, and in principle cannot provide any indication of Eve's presence at any point in the communication process. However, the optical communication links can be operated at a desired margin from the receiver sensitivity, and for known channel conditions the Eve's beam-splitting attack can be detected as it will cause sudden decrease in secrecy capacity $C_S$, defined as $$C_S = C_{AB} - C_{AE},\quad [4]$$

where $C_{AB}$ is the instantaneous capacity of Alice-Bob channel and $C_{AE}$ is the instantaneous capacity of Alice-Eve channel.

From our recent studies of multidimensional signaling systems, we have learned that channel capacity can be increased linearly with number of spatial modes N, rather than logarithmically with signal-to-noise ratio for conventional 2-D schemes. Accordingly, we advantageously employ the Bessel modes to dramatically improve secrecy capacity when compared to conventional 2-D schemes.

Figure 2:
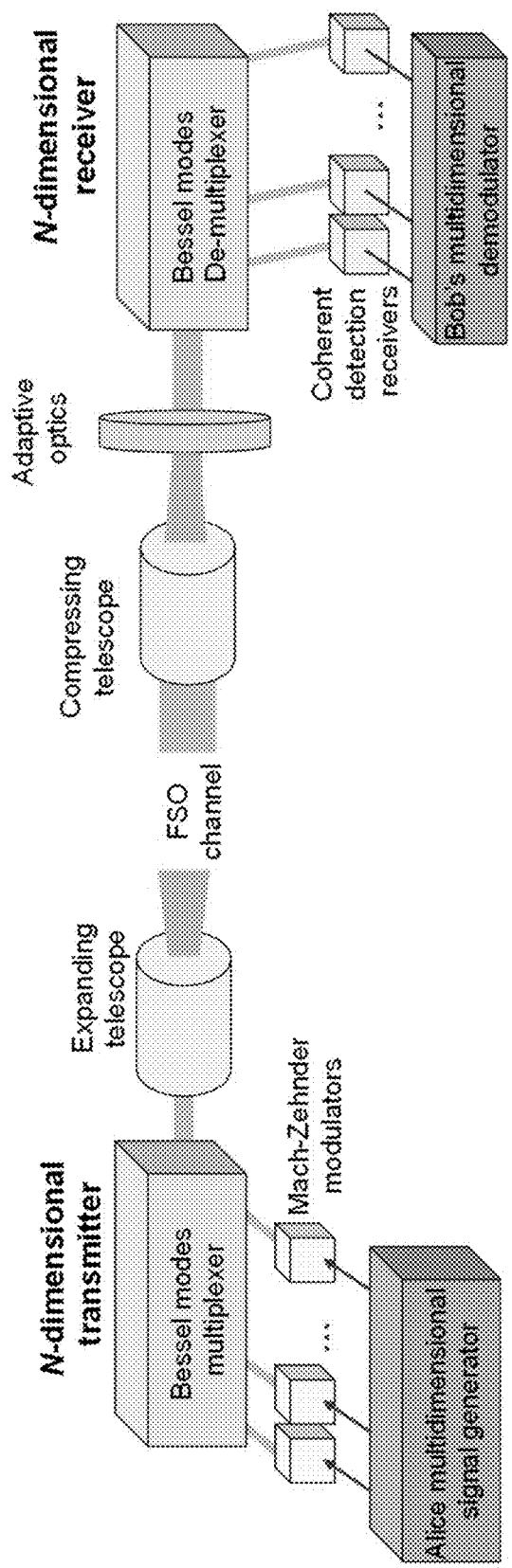
FIG. 2 is a schematic diagram of an illustrative Bessel modes-based physical-layer security scheme suitable for use in FSO links according to aspects of the present disclosure.
Figure 3A:
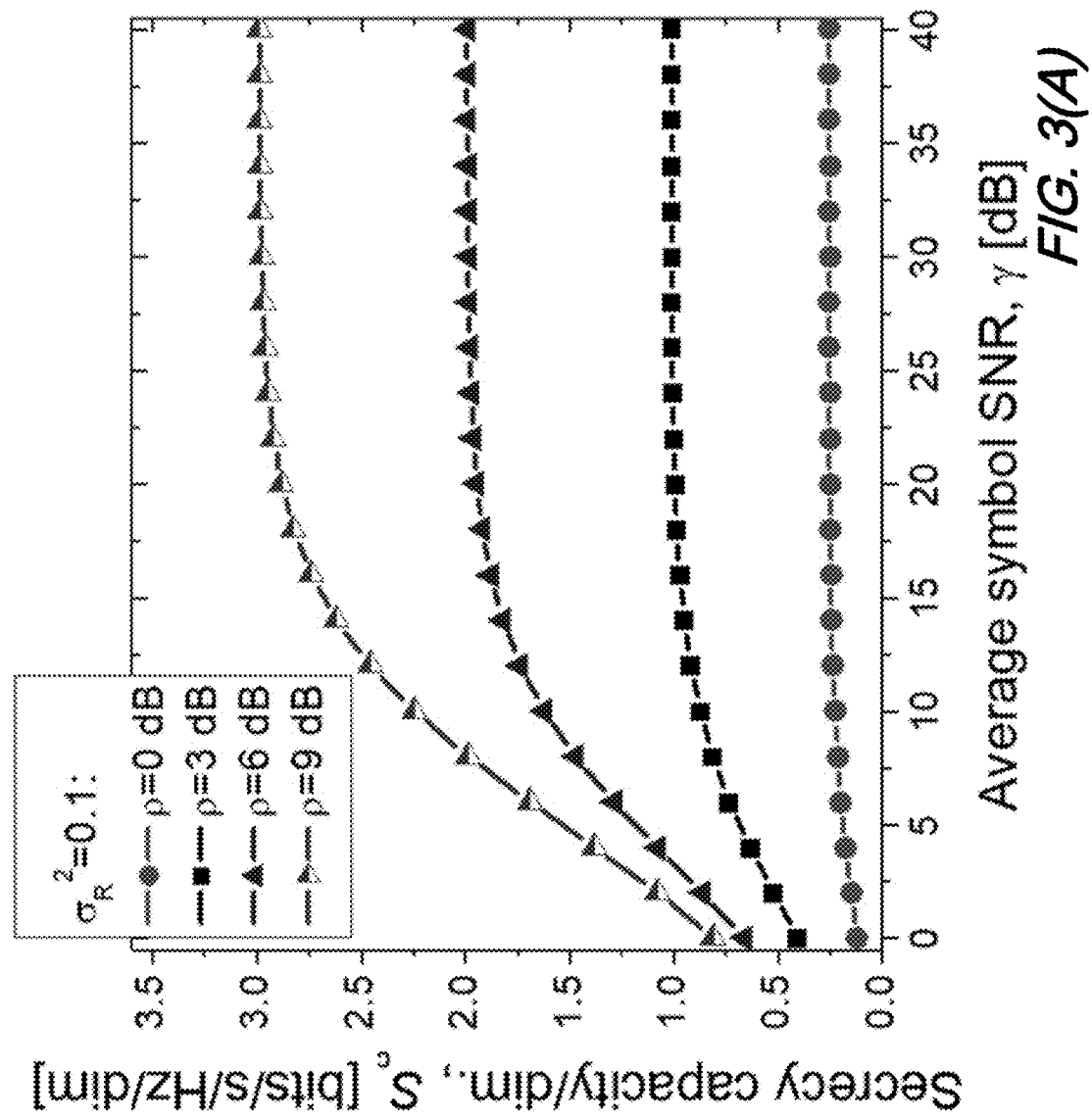
FIG. 3(A), FIG. 3(B), FIG. 3(C), and FIG. 3(D) are plots illustrating secrecy capacities of a PLS scheme over FSO links for different turbulence strengths, specified by the Rytov variance wherein atmospheric turbulence is modelled by a gamma-gamma distribution, according to aspects of the present disclosure.
Figure 3B:
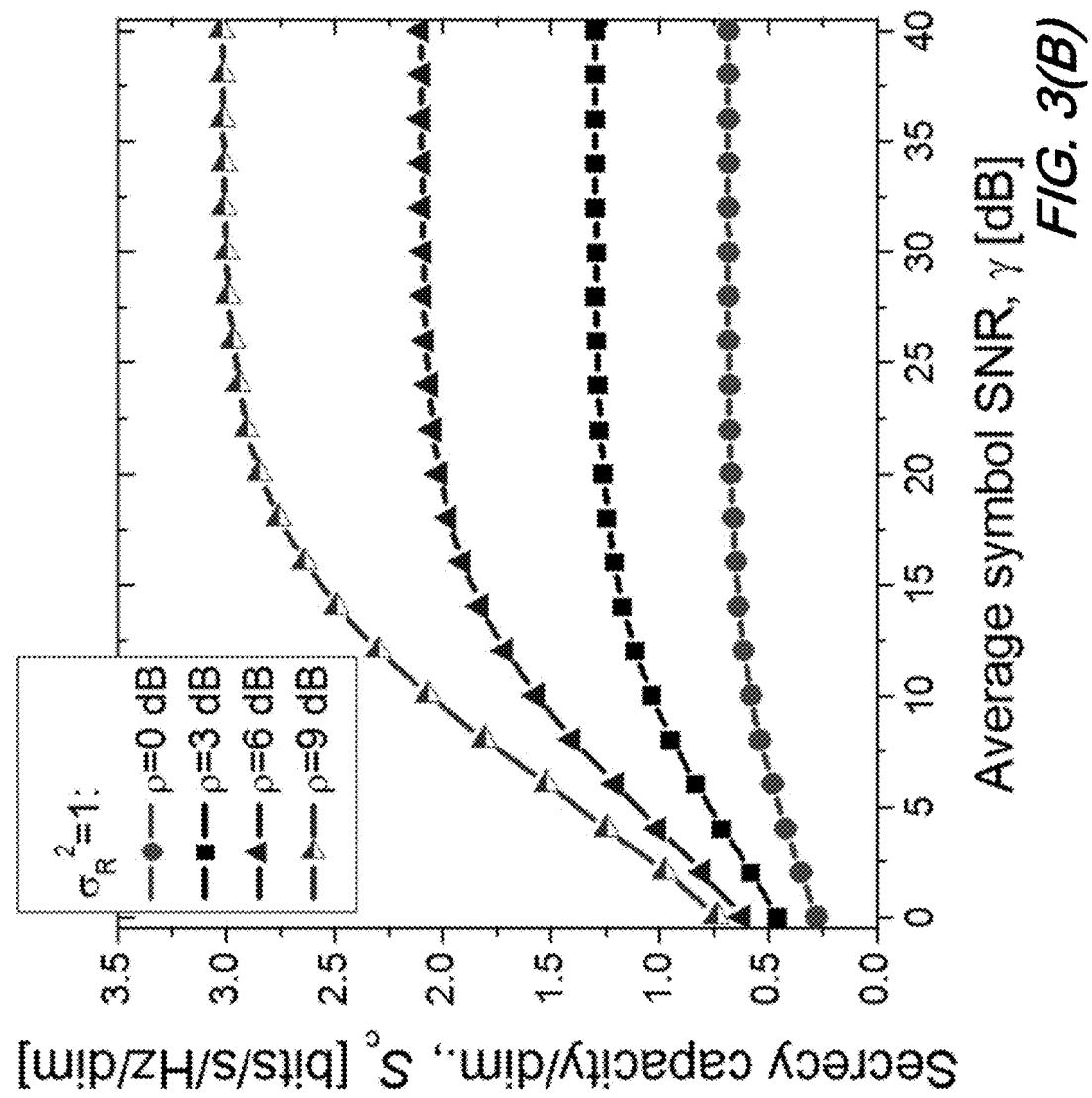
Figure 3C:
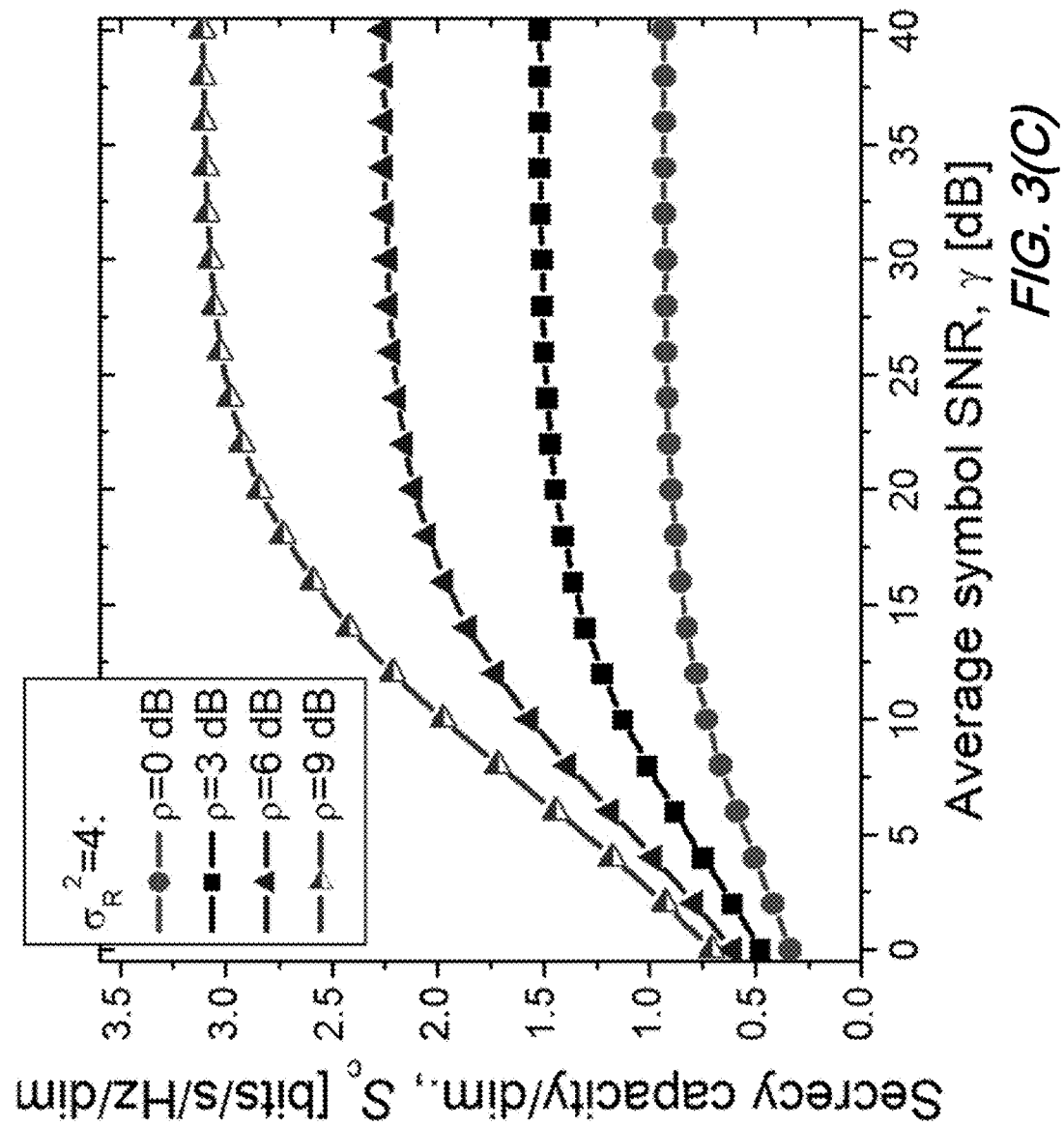
Figure 3D:
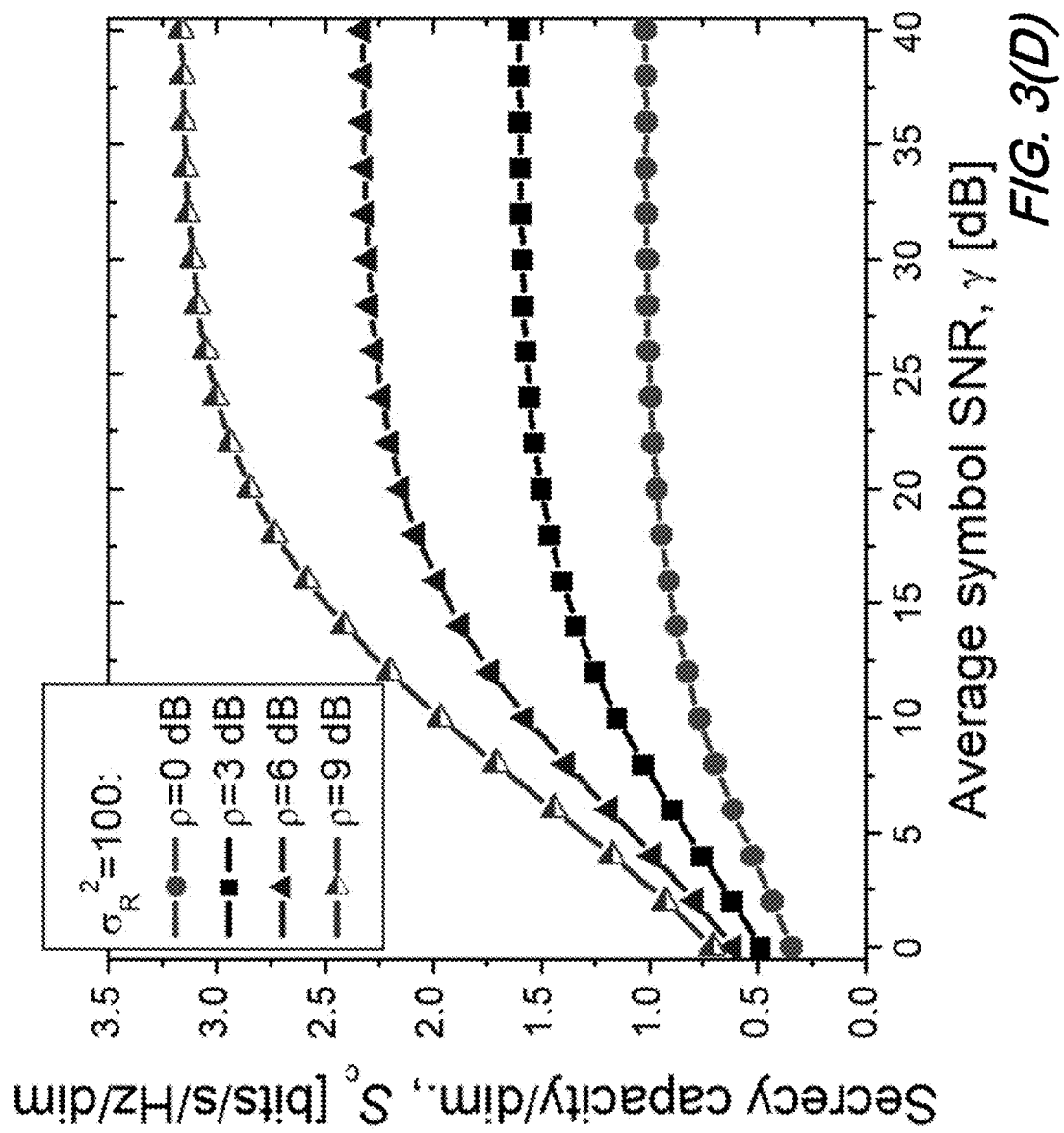

With reference now to FIG. 2—which shows illustratively a Bessel mode based physical layer security suitable for use in FSO links according to aspects of the present disclosure—we note that the use of multimode schemes to increase the secret key rates is always sensitive to the crosstalk among spatial modes and potential eavesdropper can compromise the security by relying on spatial coupling, without being detected by Alice and Bob. To solve for this problem, in addition to compensating for coupling among Bessel modes, as discussed above, we rely on multidimensional signaling.

With multidimensional signaling, the Bessel modes are used as bases functions, and by detecting the signal in any particular Bessel mode Eve will not be able to compromise security as only a single coordinate will be detected. Since we have described multidimensional signaling based on spatial modes previously (See, e.g., I. B. Djordjevic et al., IEEE Trans. Commun. vol. 62, no. 9, pp. 3262-3273, September 2014; and I. B. Djordjevic et al., IEEE Sig. Proc. Mag., vol. 31, p. 104, 2014—both incorporated by reference as if set forth at length herein), here we just briefly describe the corresponding multidimensional scheme to be used for raw key transmission.

The configurations of Bessel modes-based multidimensional modulator and mode-demultiplexer are already shown schematically in FIG. 1. The corresponding scheme suitable for use in FSO links is shown in FIG. 2.

Alice generates the binary sequence randomly. The multidimensional mapper can be implemented as a look-up table (LUT). For signal constellation size M, the $\log_2 M$ bits are used to find the coordinates of multidimensional signal constellation, obtained as we have described.

The multidimensional coordinates are used as the inputs to corresponding MZMs of multidimensional modulator, based on Bessel modes multiplexer [FIG. 1(top)]. After Bessel modes-multiplexing, the signal is transmitted over FSO system of interest.

On receiver side, after Bessel modes-demultiplexing and coherent optical detection, the estimated multidimensional coordinates are used as inputs of multidimensional a posteriori probability (APP) demapper, which provides most probably symbol being transmitted, and detected sequence is delivered to Bob.

To demonstrate potential of our physical layer security scheme for FSO links according to aspects of the present disclosure, we perform Monte Carlo simulations for different atmospheric turbulence strengths, with results of simulation summarized in FIG. 3(A), FIG. 3(B), FIG. 3(C), and FIG. 3(D) normalized per single dimension.

The Rytov variance, defined as $\sigma_R^2 = 1.23 C_n^2 (2\pi/\lambda)^{7/6} d^{11/6}$, is used to characterize the turbulence strength because it takes the propagation distance d, the operating wavelength λ, and the refractive structure parameter $C_n^2$ into account. Weak turbulence is associated with $\sigma_R^2 < 1$, the moderate with $\sigma_R^2 \approx 1$, the strong with $\sigma_R^2 > 1$, and the saturation regime is defined as $\sigma_R^2 \rightarrow \infty$. In each of the figures the ratios in average SNRs for Alice-Bob and Alice-Eve channels, defined as $\rho = \bar{\gamma}_{AB}/\bar{\gamma}_{AB}$, is used as a parameter. Given that for multiple Bessel modes, the secrecy capacity is a linear function of number of modes N, the secrecy capacity of proposed scheme can be dramatically improved compared to conventional 2-D schemes. It is interesting to notice that when Eve employs the beam-splitting attack, with $\rho \approx 0$ dB, the atmospheric turbulence helps improving the secrecy capacities At this point, while we have presented this disclosure using some specific examples, those skilled in the art will recognize that our teachings are not so limited. Accordingly, this disclosure should be only limited by the scope of the claims attached hereto.

The invention claimed is:

1. An optical communications system comprising a free-space-optical (FSO) transmitter in optical communication with a FSO receiver, said system characterized by:
   a physical-layer security (PLS) scheme employing Bessel modes;
   a step-index multimode fiber (MMF) is used to generate the Bessel modes;
   wherein the Bessel modes are solutions of a wave equation in a step-index MMF of core radius a, and the corresponding z-component of electric field in cylindrical coordinates (r,φ,z) can be represented as:

$$E_z(r,\phi,z) = A J_m(k_r r) e^{jm\phi} e^{j\beta z}, r \leq a;$$

where β is the propagation constant, $J_m(\bullet)$ is the Bessel function of the m-th order, and $k_r$ is defined as $k_r = \sqrt{n_{core}^2 k_0^2 - \beta^2}$, with $k_0 = 2\pi/\lambda$ being the free space wave number and $n_{core}$ being refractive index of the core.

2. The system according to claim 1 further characterized in that graded-index MMFs are used to generate the Bessel modes.

3. The system according to claim 1 further characterized in that multidimensional signaling is employed wherein the Bessel modes are used as basis functions.

* * * * *